United States Patent [19]
Tran et al.

[11] Patent Number: 5,883,586
[45] Date of Patent: Mar. 16, 1999

[54] EMBEDDED MISSION AVIONICS DATA LINK SYSTEM

[75] Inventors: My Tran; Anthony E. Sabatino, both of Albuquerque, N. Mex.

[73] Assignee: Honeywell Inc., Minneapolis, Minn.

[21] Appl. No.: 685,998

[22] Filed: Jul. 25, 1996

[51] Int. Cl.⁶ .................................................. G08B 21/00
[52] U.S. Cl. .................... 340/945; 340/961; 340/971; 340/990; 340/995; 340/963; 701/208
[58] Field of Search .................. 340/990, 995, 340/945, 967, 971, 963; 701/208, 14, 301, 3; 342/13, 15, 16, 17

[56] References Cited

U.S. PATENT DOCUMENTS

| | | | |
|---|---|---|---|
| 4,642,775 | 2/1987 | Cline et al. ............................... | 701/200 |
| 4,701,760 | 10/1987 | Raoux ...................................... | 340/993 |
| 4,812,843 | 3/1989 | Champion, III et al. ................ | 340/905 |
| 4,845,495 | 7/1989 | Bullard et al. ........................... | 340/973 |
| 4,872,051 | 10/1989 | Dye ........................................... | 348/113 |
| 4,918,442 | 4/1990 | Bogart, Jr. ................................ | 340/961 |
| 5,111,400 | 5/1992 | Yoder ....................................... | 701/3 |
| 5,117,360 | 5/1992 | Hotz et al. ................................ | 342/195 |
| 5,186,414 | 2/1993 | Holzschuh et al. ...................... | 244/3.12 |
| 5,227,786 | 7/1993 | Hancock ................................... | 340/961 |
| 5,287,110 | 2/1994 | Tran ......................................... | 342/13 |
| 5,293,163 | 3/1994 | Kakihara et al. ........................ | 340/995 |
| 5,313,201 | 5/1994 | Ryan ........................................ | 340/961 |
| 5,440,544 | 8/1995 | Zinser, Jr. ................................ | 370/319 |
| 5,455,823 | 10/1995 | Noreen et al. ............................ | 370/50 |

FOREIGN PATENT DOCUMENTS

| | | | |
|---|---|---|---|
| 0 427 431 A2 | 10/1990 | European Pat. Off. | ........ G01C 21/00 |
| 0 514 826 A1 | 5/1992 | European Pat. Off. | ......... G08G 5/00 |
| WO9602905 | 2/1996 | WIPO . | |

*Primary Examiner*—Benjamin C. Lee
*Attorney, Agent, or Firm*—Andrew A. Abeyta; Kenneth J. Johnson

[57] ABSTRACT

An embedded mission avionics data link system is provided which allows an aircraft to receive, transmit, and process a variety of different types of information. The present system has the capability of generating and receiving video information for viewing by a pilot in the cockpit. The system also requests, receives and recognizes situation awareness data as well as mission update data and processes this information accordingly. Any video images received by the pilot either externally or internally may be annotated and either stored in memory or transmitted externally. The system allows multiple aircraft on a mission to stay in constant communication as to relative positions to each other and targets, provide up-to-date information as to the situation which exists at the target, and do this in a mostly automatic fashion which reduces the workload of the pilot and significantly enhance the mission capability.

32 Claims, 13 Drawing Sheets

EMBEDDED MISSION AVIONICS DATA LINK SYSTEM

OBJECT OF THE INVENTION

This invention relates to a data link for a military aircraft or vehicle, and more specifically to a data link system which receives, transmits, recognizes, prioritizes, configures, and presents many different types of information and provides the flight crew the capability to extend their window of visibility in terms of imagery and precision data to other platforms.

BACKGROUND OF THE INVENTION

When a modem military aircraft flies a mission it is oftentimes necessary to fly in concert with other aircraft. This synchronous flying requires extensive planning of a route with respect to known threats, satisfactory knowledge of the threat location, and information on the capabilities of the threat. The mission planning must also include the coordination of activities among the aircraft. In order to execute a complex mission against a dangerous target, it is important that there are two-way lines of communications between all the aircraft as well as between the aircraft and a ground station.

Many modem military aircraft are equipped with a digital map system which displays to the pilot the characteristics of the terrain around the aircraft, the location of the aircraft relative to the terrain, the flight path of the aircraft, and the location of the target relative to the aircraft. Other information displayed to the pilot may include the visibility of the aircraft relative to the target and possible flight paths for the aircraft to avoid detection by the threat. The disadvantage of a digital map system is that the map image is pre-processed and does not include dynamic elements of real-time mission scenes.

Currently, military aircraft are limited on the amount of information which is received and transmitted from other aircraft as well as from a ground station. These transmissions are mostly limited to voice communications. Limited means also exist to transmit some mission information to an aircraft. As currently configured, the voice communication and mission updates require two separate systems in order to process the different types of information. The need to operate two separate systems during a mission can be a burden on the flight crew. A system which provides for greater transmission and receipt capability of flight and mission information, would only be desirable in an aircraft data link if the use of these functions did not add significantly to the workload of the flight crew. The system would have to identify the types of information being received, automatically prioritize it, and compile it in a format for the flight crew to easily access on their in-cockpit display screens.

When a military aircraft is flying a mission within the vicinity of a threat, certain types of information can increase the likelihood of the success of the mission. The effectiveness of the flight crew would be enhanced by providing means for the aircraft to communicate in many different modes and provide constant updates of each other's position as well as other mission related data. There would also be an advantage to transferring video imagery information between aircraft. One example is where a scout ship flies on ahead of the rest of the aircraft to perform some kind of reconnaissance on a target. This scout ship can then transmit back to the other aircraft as well as a ground station real-time video imagery of the target to provide up to date conditions at the threat site. Another advantageous feature would be the ability to automatically, without significant attention from the pilot, transmit updated mission information among the aircraft as well as to a ground station.

SUMMARY OF THE INVENTION

Disclosed herein is a datalink system for a vehicle which increases both mission situation awareness and capability, and at the same time reduces the workload of the vehicle crew by providing a variety of automatic functions which identify and prioritize digitized data which is received and transmitted by the vehicle. The system includes a communications apparatus which provides the vehicle two-way voice and digitized data communications. A data signal processing apparatus in connection with the communications apparatus, identifies information received externally by the vehicle, and provides to the communications apparatus, information which has been generated internally. A datalink controller directs the processing of the information received externally and the information generated by the vehicle with the datalink system. Also included is a prioritization apparatus connected to the data signal processing apparatus which prioritizes the internal information, decodes external information according to the type of mission the vehicle is on, and displays image classification. A memory, which is accessible by the datalink controller and the data signal processing apparatus, stores information generated internally and received externally. A display apparatus processes the internally and externally generated information and provides it in the proper format to the pilot for viewing. The pilot may annotate the images which appear on the cockpit displays and either store those annotated image in memory or transmit them externally.

Other objects, features and advantages of the invention will become apparent to those skilled in the art from the description of the preferred embodiment, claims and drawings hereof, wherein like numerals refer to like elements.

DESCRIPTION OF THE PREFERRED EMBODIMENT

Figure 1:
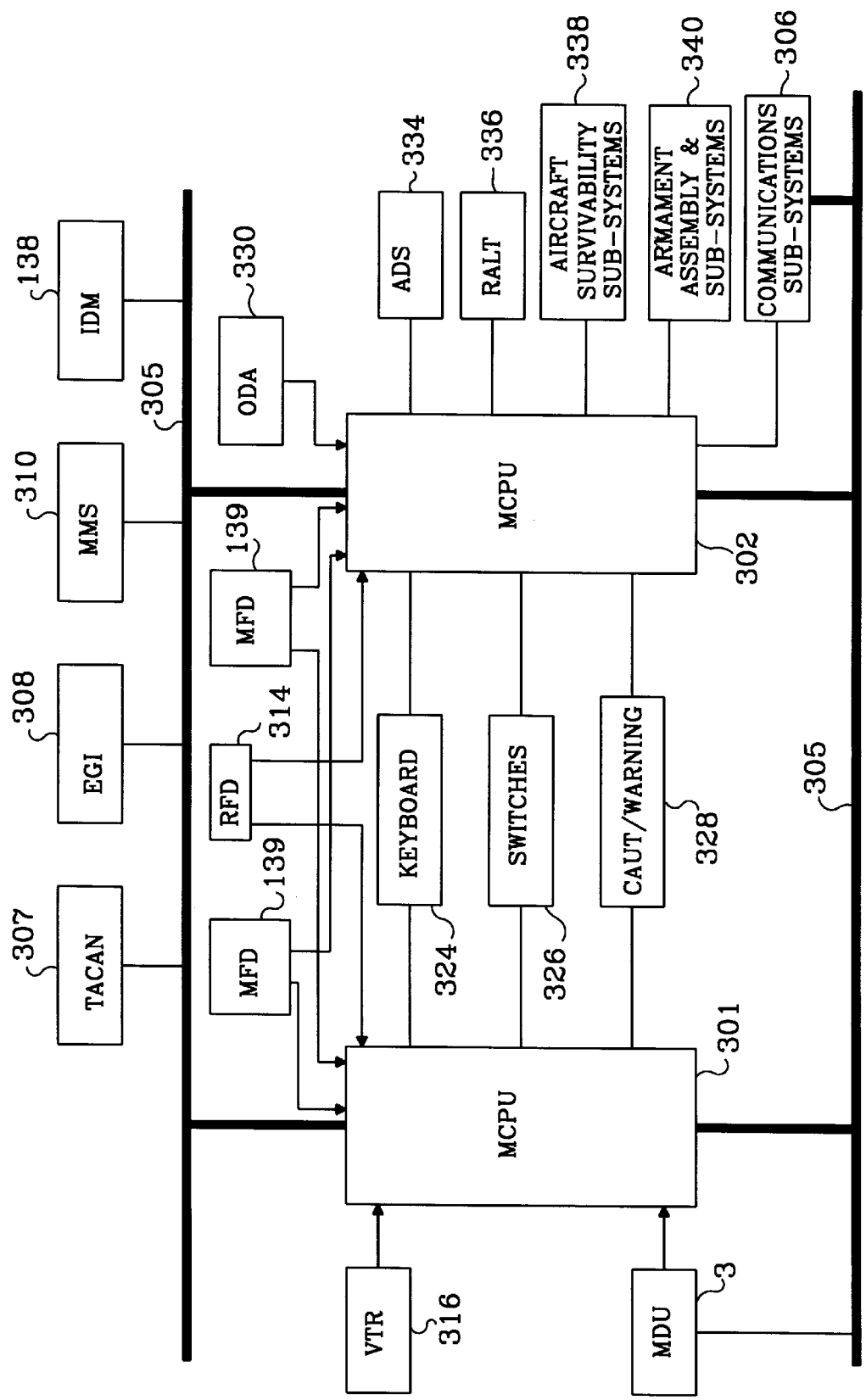
FIG. 1 is a block diagram of a mission avionics system structure.

Disclosed in FIG. 1 is a block diagram of a mission avionics system structure for a military aircraft. At the core of the system there are two master controller processor (MCPU's) units 301 and 302 which process all the information received from pilots as well as the aircraft systems and sensors. The two MCPU's process input and output signals for different aircraft systems, and also act as redundant paths for the critical aircraft functional modules. Although this is not a complete diagram of the avionics system, all the systems necessary for a description of the present invention are presented. The sensors and systems input signals to the MCPU's are either received over the avionics bus 305 or through a direct connection. Transmitting signals on the avionics bus 305 are communications sub-systems 306, the navigation radio (TACAN) 307, the embedded global positioning and inertial navigation system (EGI) 308, the mast mounted sight system (MMS) 310 which provides television video and thermal video images outside the aircraft, and the improved data modem (IDM) 138. The memory data unit (MDU) 3 is also connected to the avionics bus, but also has a high speed dedicated bus to MCPU 301. The avionics bus disclosed is a well known bus structure to those skilled in the art.

In direct connection with the MCPU 301 is the video tape recorder (VTR) 316 which records and plays back events on board the aircraft. In direct contact with MCPU 302 is the optical display assembly (ODA) 330, for night vision viewing the ANVIS Display Symbology Subsystem (ADS) 334, and the radar altimeter (RALT) 336. Also in connection with MCPU 302 are the aircraft survivability subsystems 338 and the armament assembly and subsystems 340. The aircraft survivability subsystems provide the threat status and receives system set-up commands from the pilot through the MCPU 302. The armament assembly and sub-systems 340 provide weapons status and receive weapons activation commands from the pilot through the MCPU 302.

Video images which appear on the multi-function displays (NFD) 139 and information which appears on the radio frequency display (RFD) 314 are output from both MCPU's. Both MCPU's also receive input commands from various keyboards (324) and switches (326) in the cockpit and also output signals to the caution/warning/advisory audio sub-system 328 in the cockpit.

Figure 2:
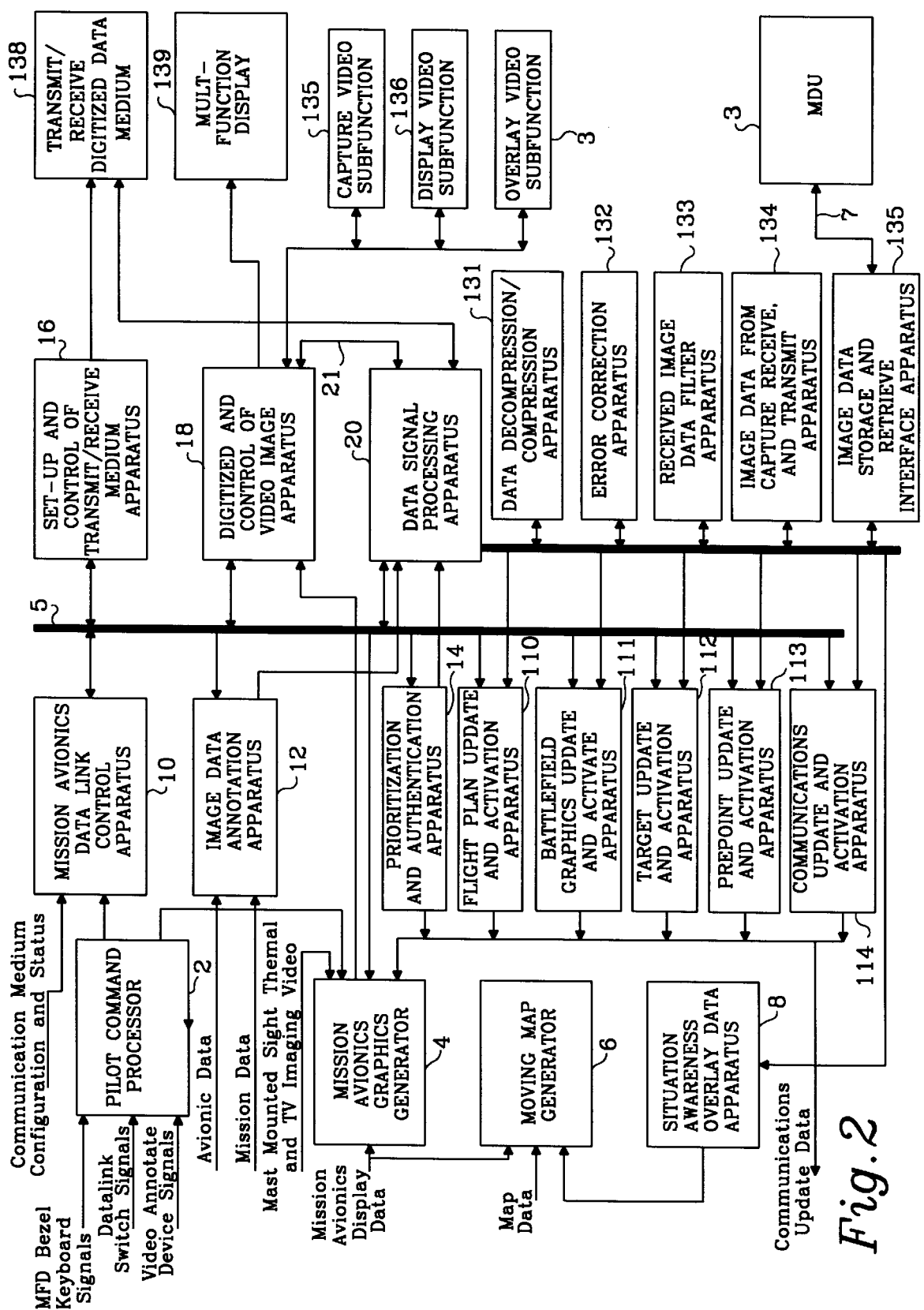
FIG. 2 is a block diagram of the Embedded Mission Avionics Data Link System.

In the preferred embodiment of the invention, the embedded mission avionics data link system of the present invention is embedded in MCPU 301. This system can also be designed so that the data link system is redundant and embedded in both MCPU's 301 and 302. A block diagram of the Embedded Mission Avionics Data Link System is shown in FIG. 2. This system is described herein as used in a military aircraft, however one skilled in the art would realize that this data link system can be applied to other types of aircraft and vehicles.

In FIG. 2, the global bus interface 5 is the primary circuit card assembly (CCA) to interface within the MCPU's. The global bus links memory on one CCA with memory on another CCA. The memory linked by the global bus is referred to as shared memory. Shared memory is used by a CCA to read or write data to another CCA. All inter CCA communications on the global bus are controlled and arbitrated by the global bus interface hardware.

The pilot command processor 2 receives the process commands from the cockpit through such devices as bezel switches, multi-functional buttons on the keyboard unit, switches on the pilot cyclic grip, push buttons and switches on control panels, a video annotation device such as a mouse, or through other switches and buttons in the cockpit. The pilot command processor 2 receives the pilot commands through the various devices in the cockpit and transmits command signals to other components in the system.

One component which receives command signals from the pilot command processor 2 is the mission avionics graphics generator 4. The mission avionics graphics generator also receives inputs from a variety of other sources which include a mast mounted sight external video camera, thermal image aircraft sensors, mission avionics display data stored in memory, and moving map video from the digital map generator 6. In response to the command signals from the pilot command processor 2, the graphics generator apparatus generates display pages made up of information from the other inputs after a video switch is set to the appropriate video output.

The pilot may choose to view any of a number of mission avionics image pages. The pilot selects which image are to be viewed from the moving map generator 6, which provides map imaging information in terms of charts, digitized terrain elevation, and scanned image placed on the global bus 5. Situation awareness data is provided to the moving map generator 6 using information from the data signal processing apparatus 20 and this situation awareness data is included with the map images. This situation awareness overlay data includes platform mission identification, present position, heading, and other significant platform information. The situation awareness data is overlaid as icon symbols on the chart or terrain elevation image provided from the moving map generator 6. With the selection of an icon symbol, the pilot will learn specific information about the platform represented by the icon such as platform ID, direction of movement, fuel remaining, mission status, and armament status.

The mission avionics data link control 10 acts as a command signal interpreter and a control device for the other components in the system based on communication medium configuration and status and data link commands. Almost any act the pilot wishes the system to perform is first processed through the mission avionics data link via a command signal from the pilot command processor 2. These commands include direction for the retrieval and storage of data in memory, establishing a configuration of the transmit and receive medium 16, determining the active modes of operations, and basically directing the operation of the components within the system structure.

The image data annotation apparatus 12 is one of the components which receives command signals from the mission avionics data link control apparatus 10. The annotation apparatus also receives avionics and mission data from other modules within the MCPU. This particular component will pack data to be annotated for each unique image page and allow the pilot to incorporate free text to denote features of the images which appear on the cockpit MFD's. For instance, the pilot may be viewing an image of the target and may wish to add written or symbolic information to that particular image which would be a benefit to other aircraft which receive this image information.

One of the novel features of the present invention is the ability of the data link to recognize and process mixed modes of data, for example, video and precision data. This system has the ability to capture, store, view, receive, transmit, combine, delete, and retrieve many different types of information and re-configure mission and equipment with minimal pilot interaction required. Data signal processing apparatus 20 is the initial processing unit for all types of information received by the aircraft and the final processing unit for all information that is transmitted to other aircraft or to a ground station. This apparatus is connected to the transmit/receive digitize data medium 138 and identifies and processes information being received or transmitted by the aircraft. This information includes video image information, mission avionics specific data, and mission avionics equipment update information. The data signal processing apparatus 20 directs the information to the appropriate component of the system after being validated by the prioritization and authorization apparatus 14.

The prioritization and authentication apparatus 14 is used to first authenticate any information which is received externally. All information which is received from outside has to be decoded and this apparatus would certify that the information was transmitted from a legitimate source. Secondly, any information which is received either externally or generated internally is prioritized according to the particular mission which the aircraft is on and the structural order defined for all image display pages. Received information which is of a high priority is stored such that it is easily accessible by the pilot. Other low priority information is stored in the available memory or filtered out.

When image information is to be displayed, that particular information must be converted to an analog video signal from digital form. If the video image is in analog signal form, it must be converted to a digital bitmap before it can be stored in memory or transmitted externally. Digitize and control video image apparatus 18 performs this function. This portion of the apparatus receives mission avionics primary video data from the mission avionics graphics generator as well as image data over the high speed bus 21 from data signal processing apparatus 20. Digitize and control video image apparatus processes the data based on video image control command data received on the global bus 5. The digitize and control video apparatus performs a variety of sub-functions which include capture video 135, display video 136, or overlay video 137. The capture video sub-function 135 allows the pilot by a switch activation in the cockpit to capture a video image currently displayed on the MFD. During operation of the aircraft, the pilot may be viewing an image from mission avionics graphics generator, moving map generator, digitize and control of video image apparatus, the mast mounted sight video, as well as an image received from an external source. The pilot may capture this single video image and store it in memory, or transmit it externally. The pilot may also add video and data annotations to the captured page. In the display video mode, video is displayed to the pilot from the source corresponding to command selected. It may be a single image file of video retrieved, continuous video images from continuous real time receiving from external sources, the mast mounted sight video, or from mission avionics graphics generator and moving map generator source. The overlay video sub-function works in conjunction with the image data annotation apparatus to allow the pilot to annotate by modifying the bitmap image to include written words or symbols on the images that are currently being displayed on the MFD.

The transmit and receive medium 138 is the electronic apparatus which actually receives and transmits the digitized data. This part of the system is actually made up of two electronic devices, a radio and a data modem. The direct link mode is used to pass information via radio to other aircraft or a ground station. The indirect link mode will use a data modem and a radio to pass information to other aircraft via a network server. The pilot can choose between the two physical data link modes depending on the mission, type of data to be received or transmitted, or the ultimate destination of the information. The configuration of the transmit/receive medium is established by the setup and control of transmit/receive medium apparatus 16. The setup and control of the transmit/receive medium apparatus 16 receives date link/medium commands through global bus 5 to set up the medium to either receive or transmit in digitized data image mode, other digitized data mode, or voice mode.

Also in connection with the global data bus 5, are a series of apparatus to update the appropriate portion of the mission plan stored in memory. When mission information is received and processed by image data signal processing 20, depending on the type of information, it is then transmitted to either flight plan update and activate 110, battlefield graphic update and activate 111, target update and activate 112, prepoint update and activate 113, or communication update and activate 114. From here, the information is transmitted to the mission avionics graphics generator and this information is displayed to the pilot. At any point after this, the pilot can then update the current mission information and store the newly updated mission data in the MDU 3.

When digitized video data and annotated data are received or transmitted from the aircraft, different operations must be performed on the data so that it is readable and recognizable by the sending source or by the intended receiving targets. Apparatus have been provided to perform these functions. When data is received by the aircraft it usually has been packed in a compressed form with error correction implanted. When uncompressed data is transmitted it needs to be compressed and provided with data error correction and then packed into subframes. Data compression/decompression apparatus 131 has been provided to perform this function. Information received and transmitted through the airways may be susceptible to noise, so the error correction apparatus 132 has been provided to insert error correction in data when transmitted, and remove the correction data when received. When image data is captured for storage or transmission to other aircraft, it is processed by the image data from capture, receive, and transmit apparatus 134 to incorporate data annotations with the digitized video image data and put this complete set of image data in the proper format. When the image receiving mode is active, the capture, receive and transmit apparatus 134 will process the received image data from the communication port and place it in an actively working partition memory to be processed by other apparatus which reside in the structure of data signal processing apparatus 20. Through the apparatus 20, the apparatus 134 will provide the feedback signals to the mission avionics data link control apparatus via the global bus 5. Finally image data storage and retrieve interface apparatus 135 acts as a two way medium between the MDU dedicated bus 7 and the MDU 3 to store and retrieve data.

Figure 3:
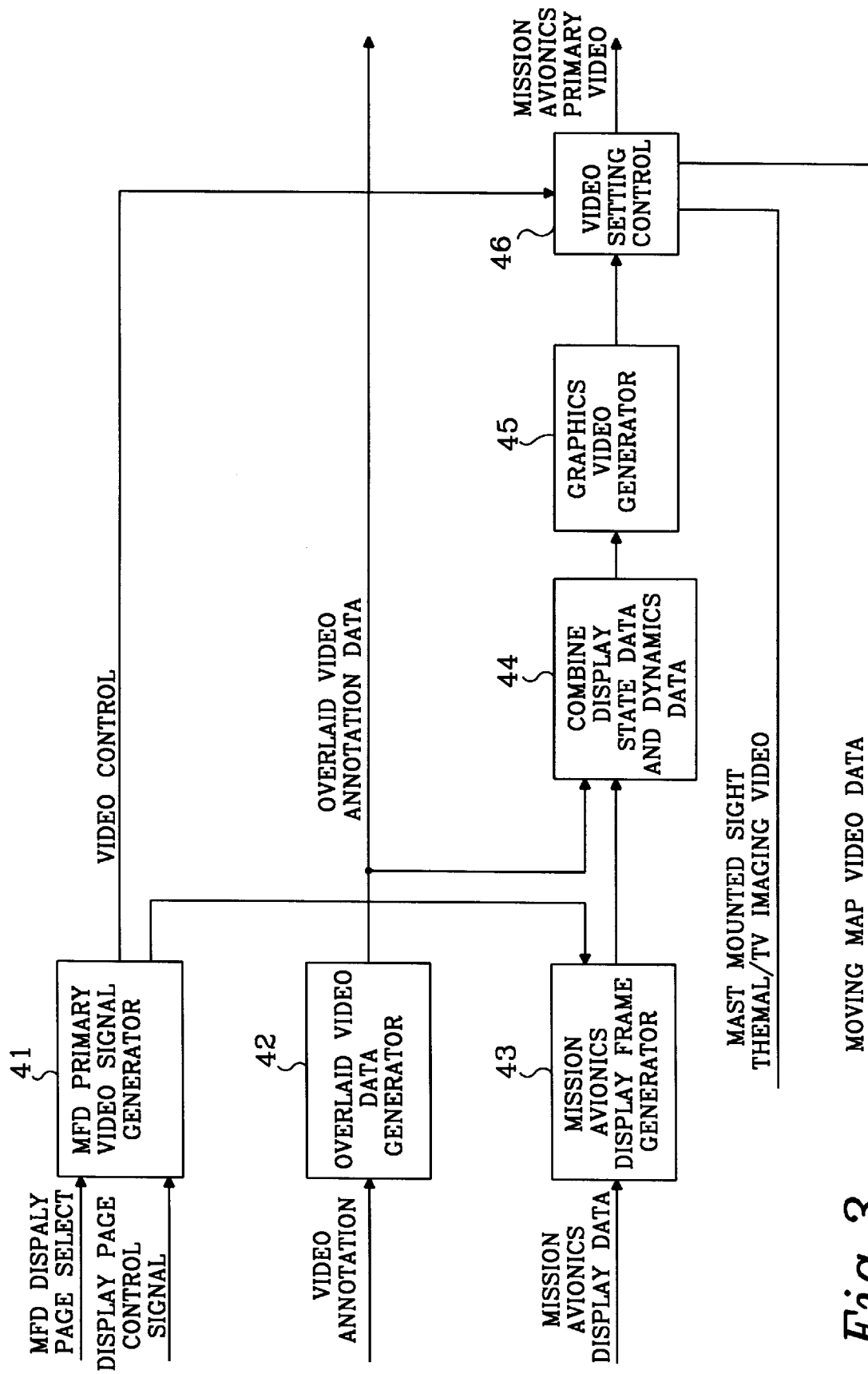
FIG. 3 is a flow chart of the mission avionics graphic generator.

Now referring to FIG. 3, a more detailed block diagram of mission avionics graphics generator has been provided. The graphics generator receives command signals from the pilot command processor in the form of a MFD display page select signal, a display page control signal, as well as a video annotation command signal. The MFD display page select signal and the display page control signal are received by the MFD primary video processor 41 which outputs a control signal to the video switching apparatus 46, as well as a selected internal mission avionics display page to the mission avionics display frame generator 43. Each unique video image displayed on the MFD is referred to as a display page. The MFD display page select and the display page control are commands to the graphics generator to display a particular image page. The video annotation command is received by the overlaid video data generator 42. A video annotation command is a command to add additional layers of information to a particular image that is being displayed. The mission avionics display frame generator 43 receives the mission avionics display data and generates individual display pages. Coming into the avionics graphics generator 4 are signals from the mast mounted sight video and the moving map video data. The mast mounted sight provides video images from the externally mounted video camera or thermal imaging of the surrounding environment. These video signals are input directly into the video switch 46. Video switch 46 acts as the video signal control to channel the video source, and mix video signals with the mission avionics primary video data.

In operation, MFD display page select and digital page control signals are output from the pilot command processor and input into the MFD primary video processor 41. These signals control which video image will appear on the MFD in the cockpit. Also initiated from the cockpit is a video annotation command in which the pilot manipulates images which appear on the MFD. In the situation where the pilot annotates the mission avionics display images, these two sources of information are mixed in combiner 44. An image page for the combined mission avionics display data and the video annotation is then generated at graphics generator video 45 which then outputs the image page to switch 46. As described previously the pilot has a choice of which images would appear in the cockpit, which are captured for storage, and which images will be transmitted externally. The switch 46 allows the pilot to choose between the mission avionics display data, moving map video data, the mast mounted sight thermal/TV imaging video, or combined video. The pilot also may view the aircraft's current situation relative to the surrounding terrain and mission situation from the moving map video data.

Figure 4:
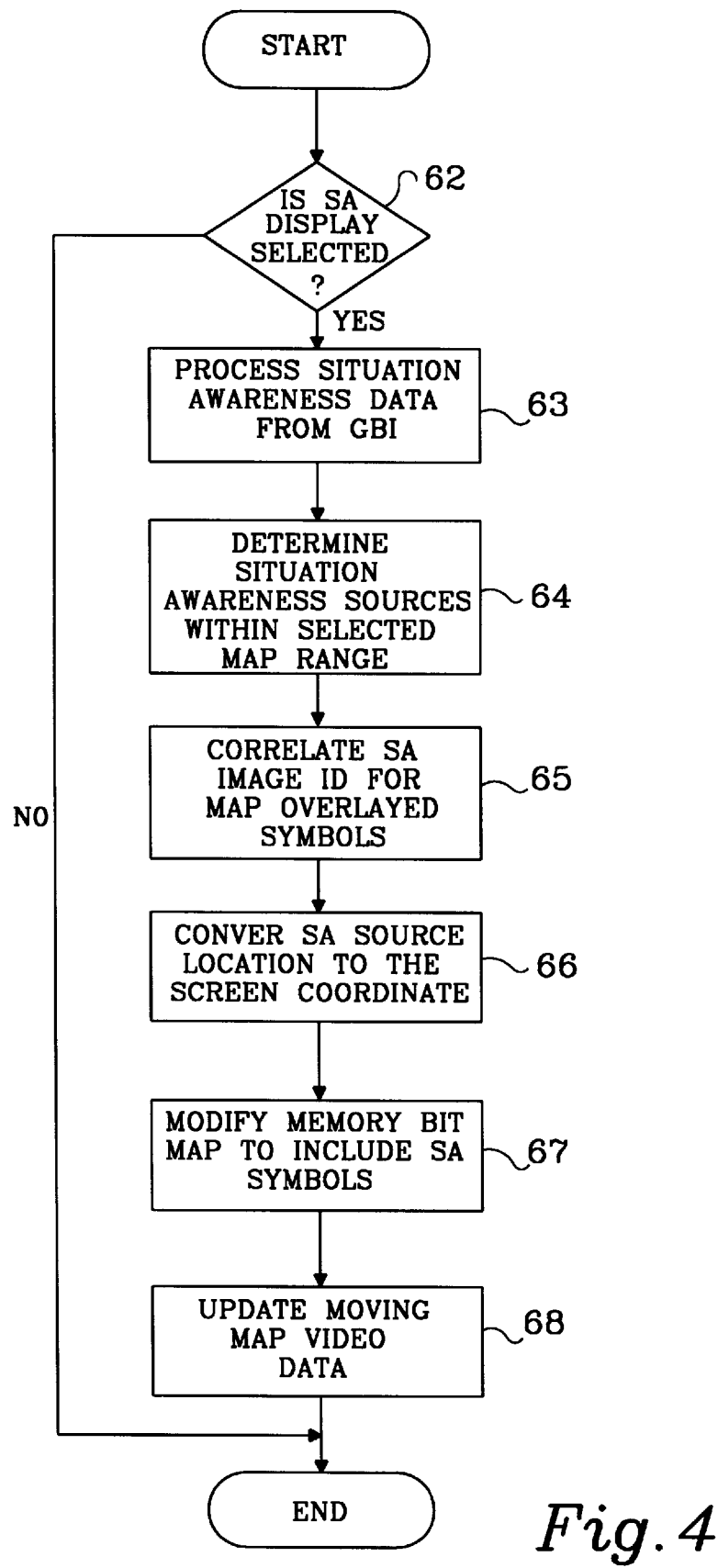
FIG. 4 is a flow chart depicting the operation of the moving map generator.

Disclosed in FIG. 4 is a flowchart which describes the operation of the moving map generator. The use of digital maps in modem aircraft is well known. Digital information about the terrain surrounding the aircraft, potential threats, and targets is stored in a digital database. As a pilot flies on a mission his current position relative to the terrain, the threats, and the target is shown on a display screen. Included with the terrain image displayed to the pilot are video symbols representing the location of other digitally detected and identified platform. This type of information is known as situation awareness data. Situation awareness data is periodically received by the data signal processing apparatus 2 either automatically or upon request of a situation awareness update. This data is further processed through situation awareness overlay data processor 8. This processing apparatus provides situation awareness data to the moving map generator 6. This information is combined with the map images in a manner which is known to those skilled in the art.

In the initial step, 62, of FIG. 4, a query is made as to whether the situation awareness display has been selected. This particular image is either a chart or the digitized terrain surrounding the aircraft which includes an overlay of the situation awareness data. If the selection mode is active, the situation awareness data from situation awareness overlay data processor 8 is processed at step 63. Because the map image is limited in the amount of area it can show, the situation awareness data at step 64 must be analyzed to determine which of this information falls within the map range currently displayed to the pilot. At step 65 the situation awareness image ID's are correlated for the map overlaid symbols. The situation awareness source locations are then converted to a screen coordinate at step 66. Then at step 67 the bitmap is modified to include the situation awareness symbols. Finally, at step 68 the map video data is then updated. This imagery is then transmitted to the mission avionics graphics generator to be viewed upon selection by the pilot.

Figure 5:
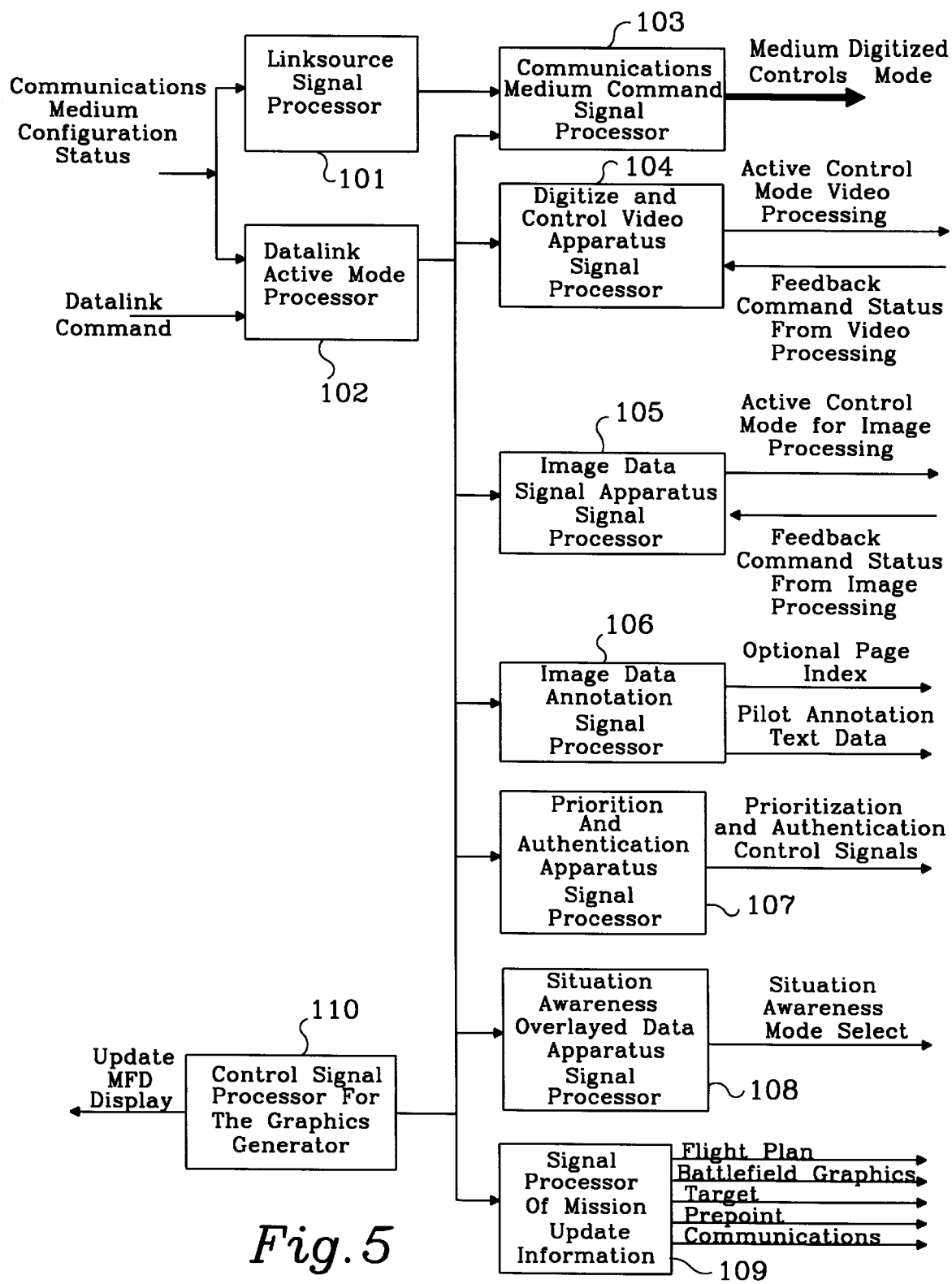
FIG. 5 is a block diagram of the mission avionics data link control.

In FIG. 5, a block diagram is provided of the mission avionics data control apparatus which processes the command signals from the pilot and provides the process activation signals to the other components in the data link system. As described above, the pilot selects these commands through a variety of control switches and buttons located on panels, pilot control grips, and any other devices in the cockpit. The commands may come from a keyboard, bezel switches on the MFD's, pilot cyclic grips, and any other control panels in the cockpit which are used for processing information. The link source 101 receives the communication medium status on the aircraft and a command from the pilot command processor which directs the configuration of the medium. A data link command signal is also received at the data link active mode processor 102 in order to establish whether the medium is in the transmit or receive mode. Signals are generated by both the 101 and 102 processors which direct the communication medium control command generator 103 to properly configure and set up hardware control for the transmit/receive medium 138. Specifically, the link source processor 101 sends the signal to activate the radio link and/or the modem, while the signal from data link active mode processor 102 properly configures the mode for the communication device which has been activated.

The data link active mode processor 102 generates all the other command signals for directing the components of the system to perform particular tasks. In response to a signal from data link active mode processor 102, digitize and control video image apparatus control processor 104 generates command signals for initiating the active control mode of the digitize and control of video image apparatus. Processor 104 receives feedback command status from the digitize and control of video image apparatus 18. According to a data link command generated in the cockpit, processor 102 directs the signal processor 105 to generate specific commands for active modes of the data signal processing apparatus 20 and to receive feedback signals of the operational mode states. A control command of the optional page index is generated from command signal generator 106 for directing the operation of image data annotation apparatus 12. When the datalink command is either capture image, receive image, or continuous receive/view image, processor 102 directs the prioritization and authentication processor 107 to generate a prioritization and authentication control signal to apparatus 14. Command signal generator 108 directs the operation of the situation awareness overlay data apparatus 8 when the situation awareness auto mode or update mode is active. Command signal generator 109 directs the operation of the flight plan update and activation apparatus 110, battlefield graphics update and activation apparatus 111, target update and activation apparatus 112, prepoint update and activation apparatus 113, and communications update and activation apparatus 114. Further, command signal generator 110 provides control signals for the operation of mission avionics graphics generator 4 to generate specific display page selected by the datalink command. Disclosed in table 1 is a full list of commands executed by the mission avionics data link control apparatus.

TABLE 1

| | |
|---|---|
| Capture Image | Store Image |
| Send Image | Preview Image |
| Receive Image | Continuous Receive/View Image |
| Update SA | Delete List |
| Error Correction ON/OFF | Flight plan Update |
| Battlefield Graphics Update | Target Update |
| Prepoint Update | Communication Update |
| Select Image | Situation Awareness Update |
| Situation Awareness Auto Mode | Image List |
| | Image Resolution |

Figure 6:
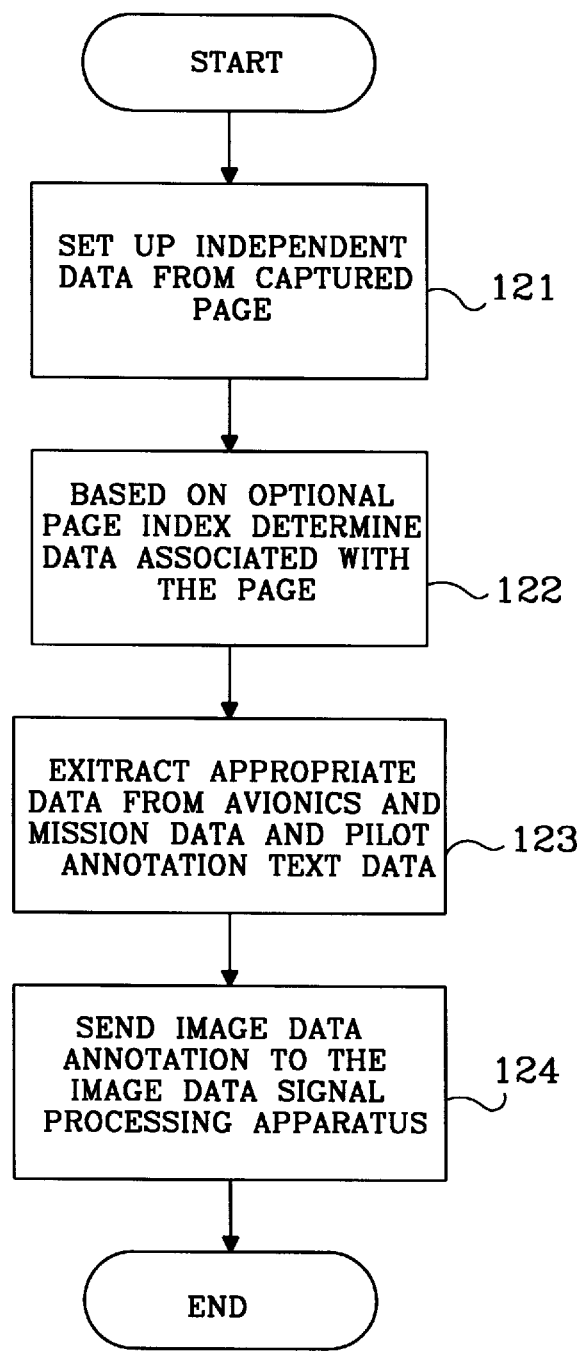
FIG. 6 is a flow chart of the image data annotation process.

The operation of the image data annotation apparatus 12, is described in the flowchart of FIG. 6. The image data annotation apparatus is a tool for the pilot to annotate an image that is currently appearing on a cockpit display after it has been captured or received and is residing in the digitize and control video image apparatus. In response to the command signal from the mission avionics data link control 10, the image data annotation apparatus receives a signal from the image data annotation signal processing element 106 to indicate the active display page image (i.e., one of 70 image pages—navigation display pages, map image display pages, mast mounted sight display pages, weapon display pages, communication display pages, and other pages) and correlates this optional page index with a resident data base to extract a set of core parameter data to provide the digitize and control video image apparatus. This is done at step 121. In step 122, based on the captured page, as indicated by operation page index, the index is used to correlate with a resident database to determine the unique parameter data set that is associated with the page captured by the pilot. At step 123, the data associated with the captured page is retrieved from the avionics and mission data inputs and included with the pilot annotation text data. At 124, the annotated image is transmitted to the digitized and control of video image apparatus for viewing, and to the data signal processing apparatus for storing, and transmission.

Figure 7:
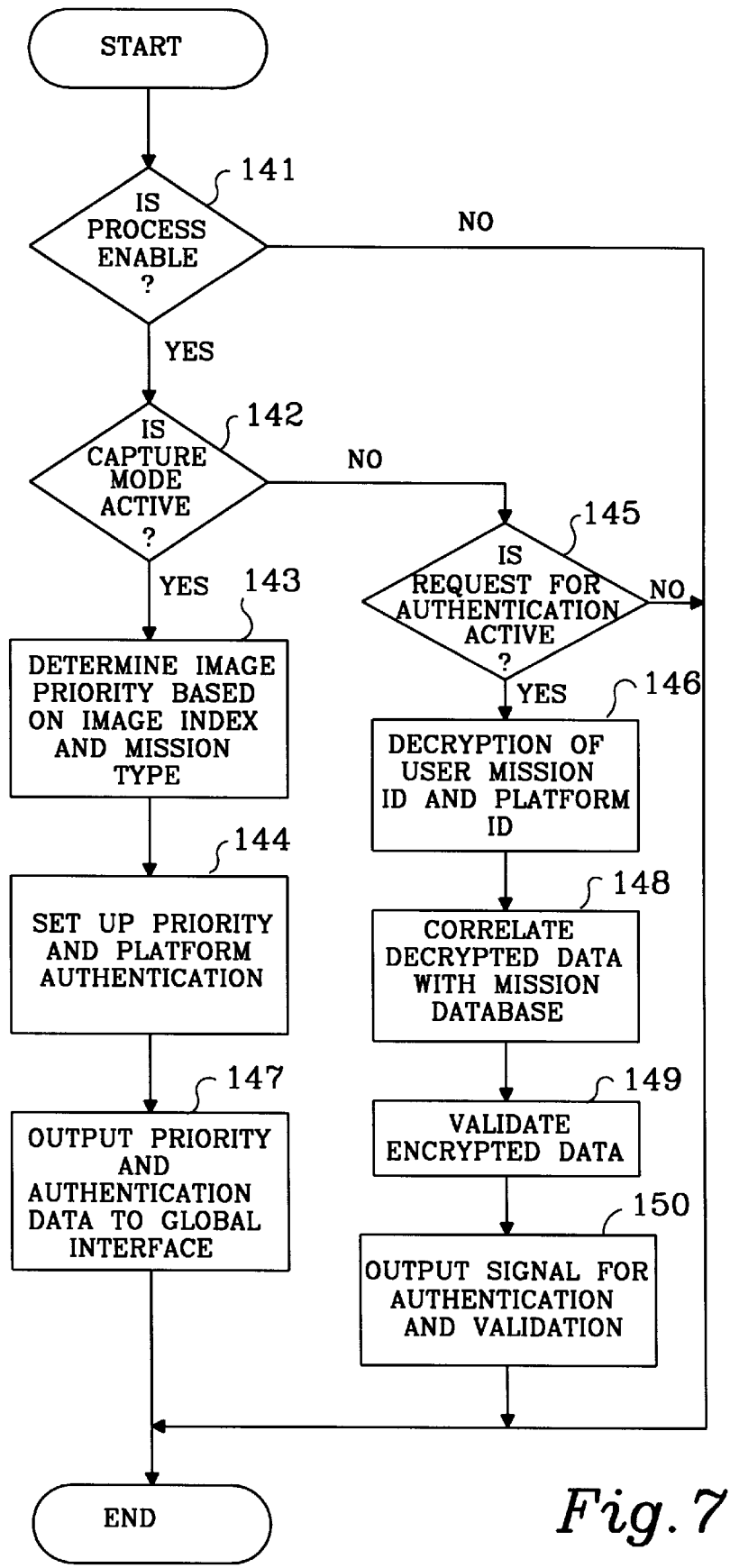
FIG. 7 is a flow chart of the prioritization and authentication process.

Before any information received from outside the aircraft can be used by the data link system, it must first be authenticated. Once it is authenticated, then this information is prioritized according to parameters established for the particular mission the aircraft is on as well as the particular source of information. FIG. 7 discloses a flowchart which shows in detail the steps performed during the prioritization and authentication process. First at step 141 an inquiry is made as to whether this particular process is enabled as indicated by the prioritization and authentication controls signal. In the datalink system, a command (such as captured image, receive image, or continuous receive image) is received from the mission avionics data link control to start this process. If the answer is yes, at step 142 a second query is made as to whether the capture image mode is active. If the capture mode is active, it means that the pilot first captures the video image currently displayed on the MED. This information does not need to be encrypted and decrypted, so at step 143 the information is given a priority depending on the type of display page captured and mission of the aircraft is on. At step 144, image information which has been captured and authenticated along with mission identification and platform identification is encrypted and provided to the data signal processing apparatus to place in the header frame of the captured image data file. At step 147 the output of priority and authentication data is transferred to the global bus to be accessed by the data signal processing apparatus 20.

If the capture mode is not active at step 142, this means that the datalink system is in the data receive mode and is receiving information from an external source via the transmit/receive medium. A query is made at step 145 as to whether the request for validation of authentication is active. If it is, the data which has been received is decrypted at step 146 to determine the Mission ID and the Platform ID of the external source which transmitted the information. Once the data has been decrypted, at step 148 the data is correlated with the mission database. If correlation can be derived from matching with known mission identification and platform, a signal to indicate the completion of authentication and validation of the received image is provided. The information requested is then placed on the global bus interface at step 150 for further processing by the data signal processing apparatus 20 to the appropriate destination.

Figure 8:
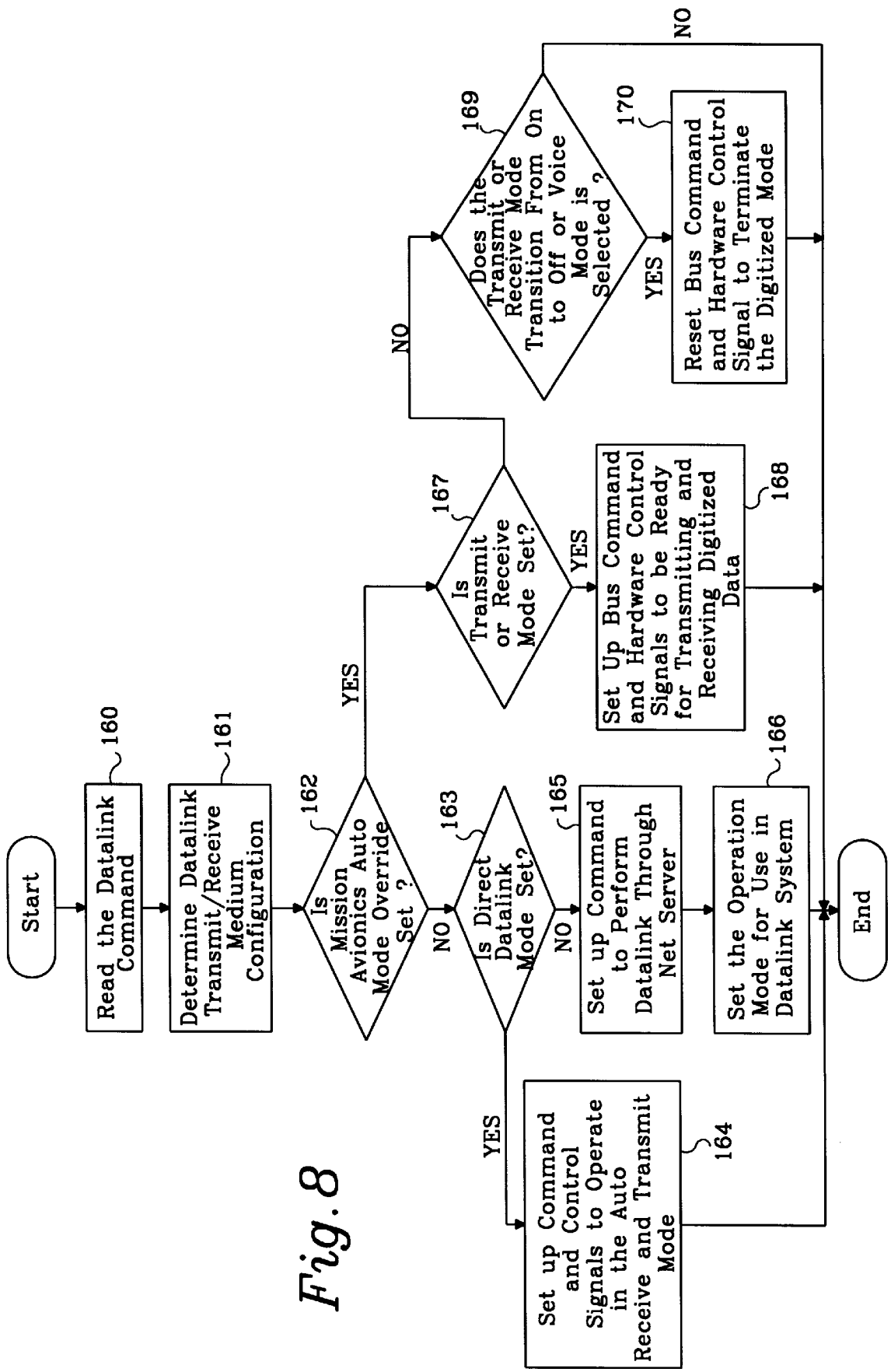
FIG. 8 is a flow chart depicting the operation of the set up and control of the transmit/receive medium.

FIG. 8 is a flowchart describing the operation of the set-up and control of the transmit/receive medium apparatus 16. At step 160, the datalink medium configuration provided by the mission avionics data link control apparatus 10 on the global bus interface is read. From this command the configuration of the transmit/receive medium is determined at step 161. A query is then made at step 162 as to whether the automatic receive and transmit mode override has been set. If it has, second query is made at step 167 as to whether the transmit/receive mode has been set. If the mode is set, at step 168 the bus command and hardware control are set up to be ready for transmitting and receiving digitized data. If the transmit/receive mode is not set, a query is made at step 169 as to whether the transmit/ receive mode transitions from on to off or the voice mode has been selected. If either is true, at step 170, the bus command and hardware controller is reset to terminate the digitized mode of operations. If the transmit/receive mode does not transition from on to off, the process goes to end.

If the mission avionics auto mode override is not set at step 162, a query is made at step 163 as to whether the direct datalink mode is set. The direct datalink uses radio to transmit the digitized data of image files without being required to interact with a data modem. If the direct datalink mode is set at step 164, command and control signals are transmitted to the radio to operate in the auto receive and transmit mode. If, at step 165, the direct datalink mode is not set, the indirect datalink is active. The datalink functions are performed through a network server. At step 165, a set up command is sent to the data modem and radio to command operations in the video imaging transfer mode. At step 166, the control of operation mode for the radio is set for use in an indirect datalink system.

Figure 9:
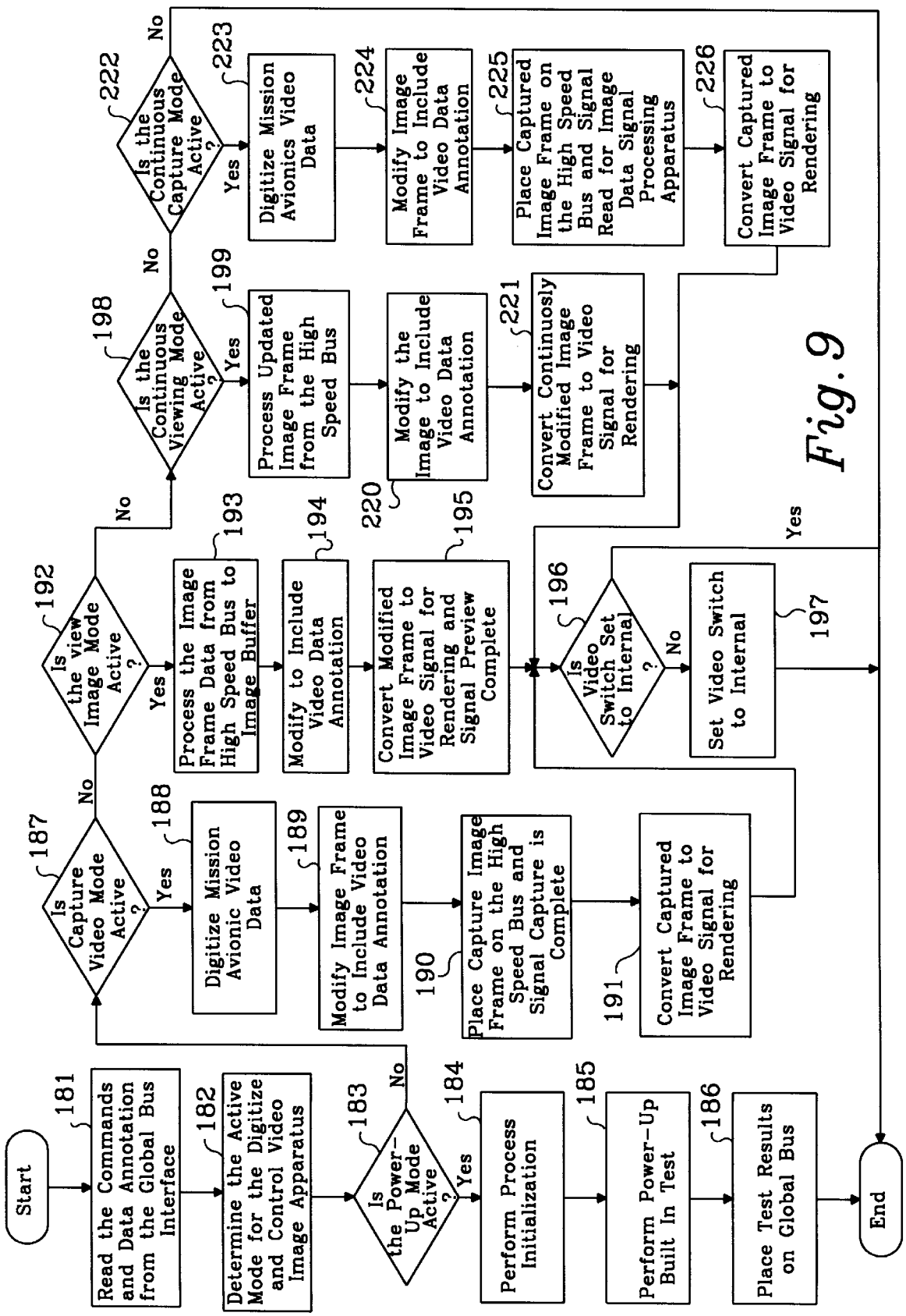
FIG. 9 is a flow chart depicting the operation of the digitize and control of video image apparatus.

A flowchart describing the operation of the digitize and control video image apparatus is provided in FIG. 9. Included with this apparatus are three functional modules, capture video 135, display video 136, and overlay video 137. In operation, the command signals and data annotation are first read from the global bus interface at step 181. At step 182 the active mode for this particular component is determined. At step 183 an inquiry is made as to whether the power-up mode is active. If the power-up mode is active, a process initialization is performed at step 184, a power-up sequence is performed at step 185, and the test results of the power-up are put on the global bus interface at step 186. If the power up mode is not active, then the query is made at step 187 as to whether the capture video mode is active. If the capture video mode is active, the video image currently appearing on a cockpit display is digitized at step 188. The image frame is then modified to include the video data annotations at step 189. The captured image frame with the video annotations is then placed on the high speed data bus 5 to the data signal processing apparatus 20 at step 190. The captured image frame is then converted to a video signal for rendering at step 191. The query is then made at step 196 as to whether the video switch is set to internal. If it is not, it is then set to internal at 197.

If the capture mode is not active, then the query is made at step 192 as to whether the view mode is active. If it is, at step 193, image frame data transmitted by the data signal processing apparatus on the high speed bus is placed in the image buffer. At step 194 the image frame is then modified to include data annotations. At step 195 the modified image frame is then converted to a video signal for image rendering. Once again at step 196 the query is made as to whether the video switch is set to internal and if it is not, it is then set to internal.

A query is made at step 198 as to whether the active continuous viewing mode is active. If it is, at step 199 the updated image frame from the high speed bus is first processed. The image frame is then modified to include video data annotations at step 220. The continuously modified image is then converted to a video signal for rendering at step 221. As with the other modes, the query is made as to whether the video switch is set to internal and if it is not, the switch is set. The main function of the digitize and control video image apparatus is to prepare video images for viewing by the pilot in the cockpit or to convert video images generated internally or received externally to digital bitmaps for storage in memory or transmission externally.

A final query is made at step 222 as to whether the continuous capture mode is active. If the answer is no, the process ends. If the answer is yes, the mission avionics data is first digitized at step 223. At step 224, the image frame currently captured is annotated to include the video data annotation. At step 225, the captured image with the video annotations is placed on the high speed bus to the data signal processing apparatus 20. At step 226 the image frame is then converted to a video signal for viewing. As with the other sub-programs, the query is then made at step 196 as to whether the video switch is set to internal, and if it is not, it is switched to internal at step 197.

The detailed operation of the data signal processing apparatus is disclosed in a flowchart of FIGS. 10a–d. The function of the data signal processing apparatus is to identify and process the different types of information which are received and transmitted through the transmit/receive medium 138 and stored in the MDU 3. This component also stores the various types of information to memory or updates the current mission plan. The apparatus performs several processes in parallel. The data signal processing apparatus also provides digitize and control video image apparatus 18 with digital bitmaps to convert to video signals to display on the MFD.

Figure 10A:
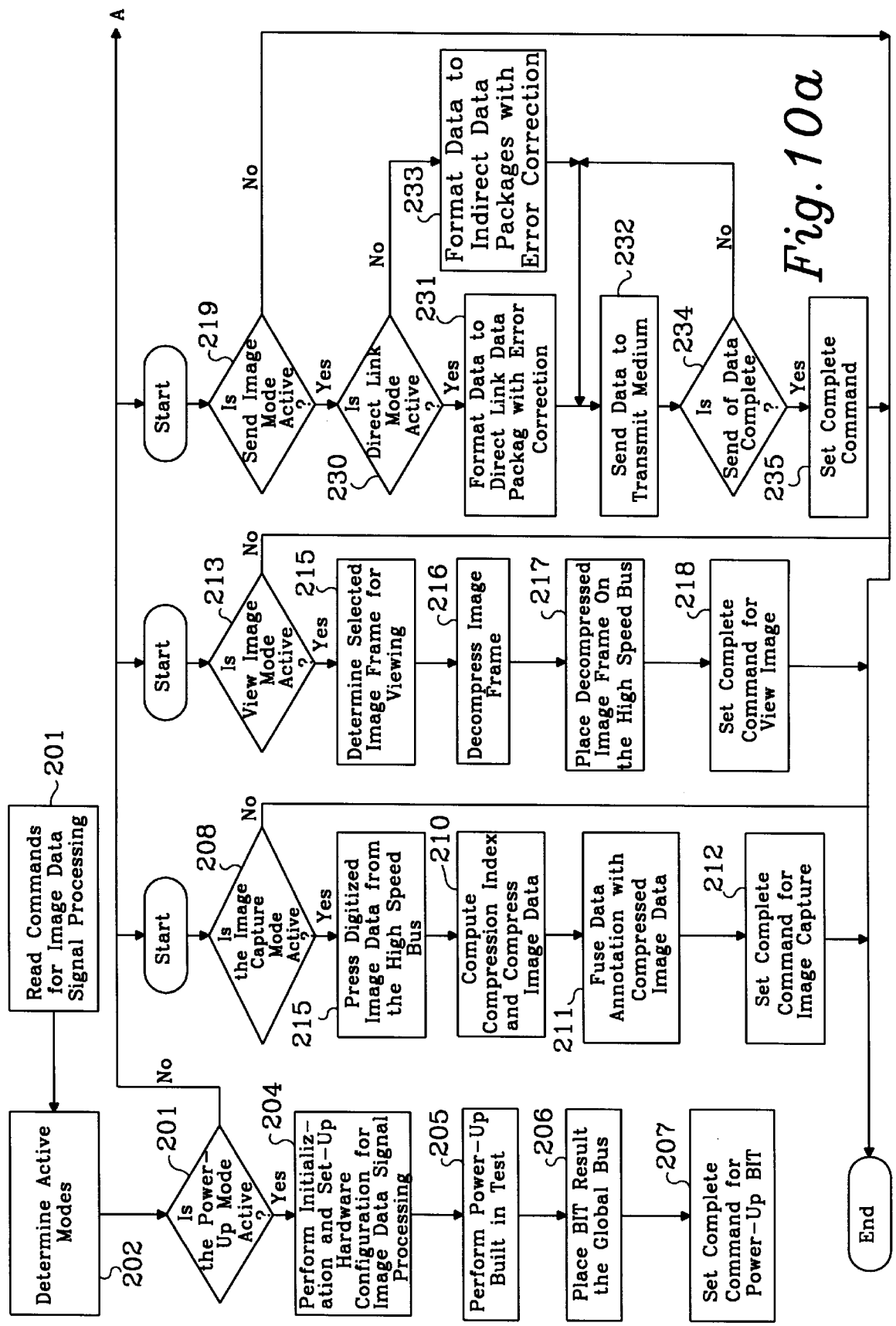
FIGS. 10a–d is a flow chart depicting the operation of the data signal processing apparatus.

In FIG. 10a, initially commands for image data signal processing are transmitted from the mission avionics data link control 10 and are read at step 201. At step 202, it is determined which modes are active. If the power-up mode is active, according to the query at step 203, an initialization and setup of the configuration for image data signal processing is performed. At step 205, a power-up test is performed. At step 206, the results of the power-up test are then placed on the global bus interface and a complete command for the test is set at step 207. If the data signal processing apparatus is in its operational mode, the first query at step 208 is whether the image capture mode is active. If the answer to that is yes, the digitize image data from the high speed bus is received at step 209. At step 210, the index compression is computed based on the image resolution command to provide image contrast level and image transmit/receive time. The image data is then compressed and at step 211, fused with the data annotations. The capture mode is then complete at step 212 and the image data is stored in an active buffer and is ready for transferring to the MDU 3 or transmitting externally.

The process to view an image begins at step 213. If the view image mode is active, at step 215 the pilot determines which selected image frame is for viewing. At step 216 the chosen image frame is decompressed and placed on the high speed bus to the digitize and control image apparatus 18. At this point the image is converted to a video signal in analog form to display on a MFD for viewing. This process is then complete at step 218.

The procedure to send an image begins at step 219. Once it is determined that the send image mode is active, a query is then made at step 230 as to whether the direct link mode is active. If it is not, the data is formatted to an indirect data package with error correction at step 233. If the direct mode link is active, at step 231 the data is formatted for the direct link data package with error correction. At step 232, with either the indirect or direct data format the data is sent to the transmit/receive medium. At step 234, the query is made as to whether the data send is complete. The procedure is then completed at step 235.

Figure 10B:
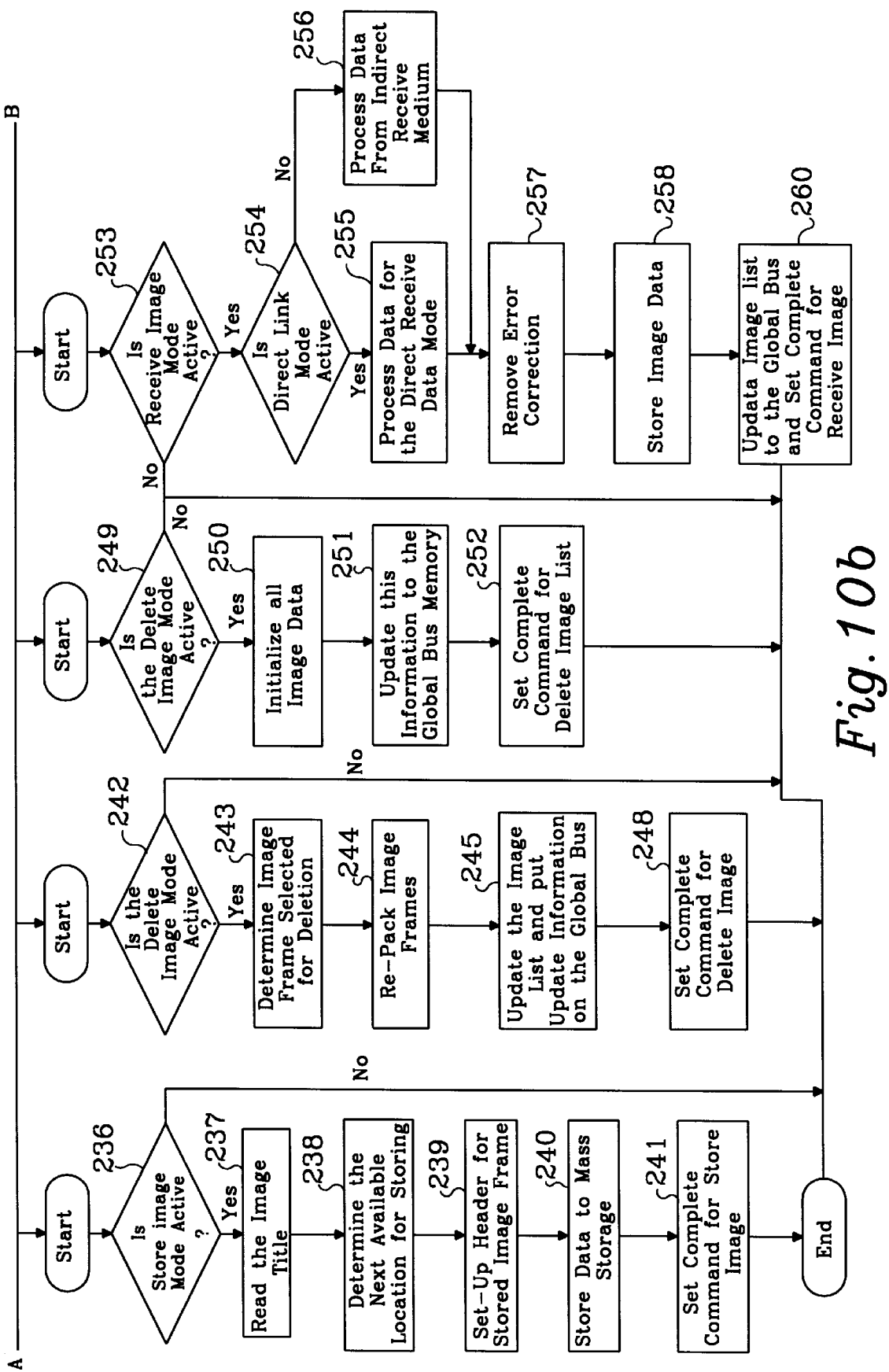

The process to store an image begins at step 236 of FIG. 10b. Once it is determined which image is to be stored, the image title is read at step 237. At step 238, it is determined where the next available location for storing is. At step 239, a header is set up for the stored image frame and at step 240 the image is sent to the MDU 3. At step 241, the process is complete.

The procedure to delete an image begins at step 242. At step 243, it is determined which image frame has been selected for deletion. The image is then deleted and the remaining image frames are repacked at 244. At step 245, the image list is updated to indicate the deletion of a selected image frame and the updated information is then put on the global bus memory. At 248 the process is complete.

The process to delete an image list stored in memory begins at step 249. At step 250, all image data is first initialized. At step 251, this information is then updated on the global bus memory. At step 252 the process is complete.

The process to receive an image frame begins at step 253. At step 254, a query is made as to whether the direct link mode is active. If the direct link mode is active, the data is processed from the direct receive medium at step 255. If the direct link mode is not active, preparations are made at step 256 to process data from the indirect receive medium. Once the image is received, the error correction is removed at step 257 and the image data is stored at step 258. At this point the image list to the global bus memory is then updated. At step 260 the steps are complete.

Figure 10C:
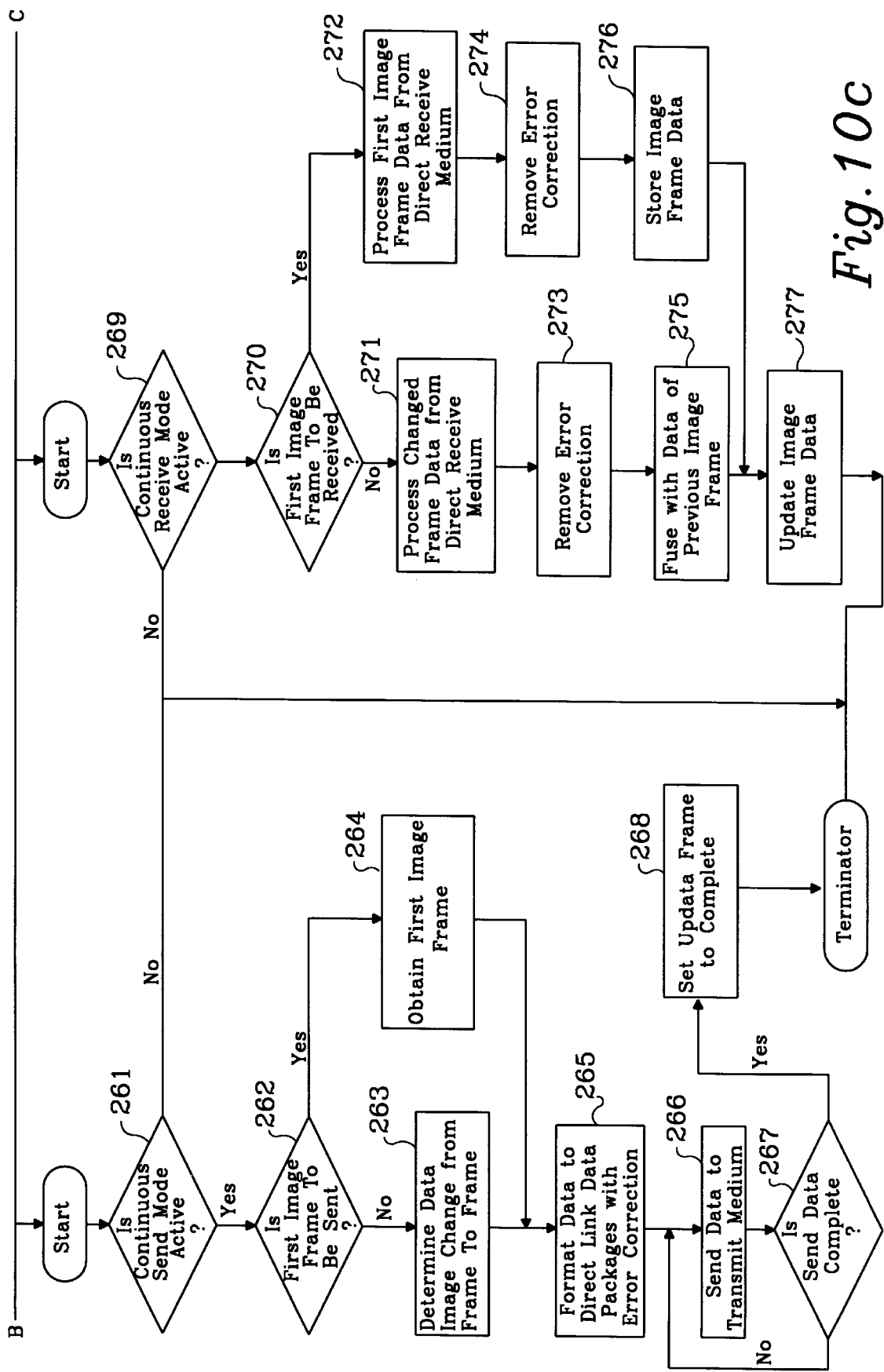

The process for a continuous send of images begins at step 261 of FIG. 10c. At step 262, the query is made as to whether the first image frame is to be sent. If the answer is yes, at step 264 the first image frame is obtained. If the answer is no, at step 263 it is determined what is the change in data image from the current frame to the previous frame. Data representing the first image frame or changes from the current frame to the previous frame are formatted at step 265. The formatted data is then sent to the transmit medium at step 266. At step 267 the query is made as to whether the transmit is complete. If it is not, the procedure is continued with step 266. If it is yes, the process is then complete.

The continuous receive image process begins at step 269. At step 270, a query is made as to whether the first image frame is to be received. If the answer is yes, at step 272 first image frame data is processed from the direct receive medium. At step 274, the error corrections are removed and at step 276 the image frame is stored in memory. If the answer is no as to whether the first image frame is to be received, at step 271 changed frame data is processed from the direct receive medium. At step 273 the error correction is made and at step 275 the data is fused with other data from the previous image frame. At step 277, the image frame data is updated.

Figure 10D:
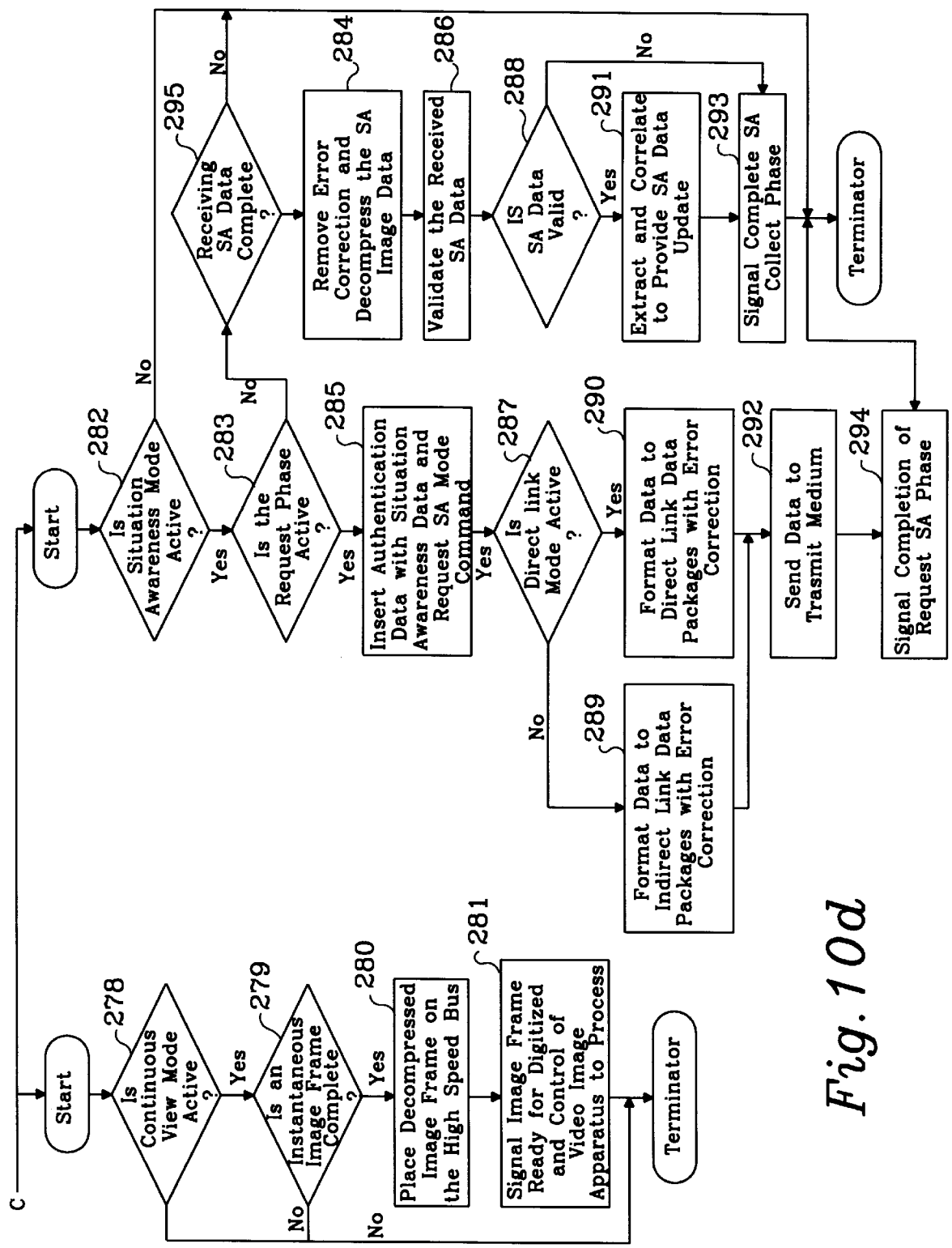

In FIG. 10*d*, at step 278 the query is made as to whether the continuous view mode is active. If it is, a second query is made as to whether an instantaneous image frame is complete. If the answer is yes, the decompressed image frame is placed on the high speed bus at step 280. At step 281, the image frame is ready to be transmitted to the digitize and control of video image apparatus to further process. The process is then terminated.

At step 282, the query is made as to whether the situation awareness mode is active. If it is not, the process ends. At step 283, a second query is made as to whether the request phase for situation awareness data is active based on requests from other aircraft or periodically on aircraft request. If it is active at step 285, authentication data is inserted with situation awareness data including requested SA data command. A query is then made at step 287 as to whether the direct link mode is active. If the answer is no, at step 289 the data is formatted to indirect link data packages with error correction. If the answer is yes at step 290, the data is formatted to direct link data packages with error correction. At step 292 the data is sent to the transmit medium. At step 294, a signal is sent noting completion of the requested phase.

Returning to step 283 if the requested SA phase is not active, at step 295 the query is made as to whether receiving SA data is complete. If it is complete at step 284, the error correction is removed and the situation awareness image data is compressed. At step 286, the situation awareness data is validated. At step 288, a query is made as to whether the situation awareness data is valid. If it is valid, at step 291 the situation awareness data is extracted and correlated to provide a situation awareness data update. At step 293 the completion of the situation awareness collection phase is signaled. The process is then terminated. Returning to step 295, if the receiving SA data is not complete, the process is terminated.

In operation, the avionics data link system operates in a number of modes which will be described in detail below. The novel feature of the present invention is that a data link system has been created which allows the automatic processing of multiple forms of data and analog video data, digitized video data, overlaid video annotation data, free text and precision mission avionics data. No prior art systems known have demonstrated the ability to process multiple kinds of data in real time and let the pilot of an aircraft transmit and receive mixed mode data, update flight plan, mission related data, communication operational data, and situation awareness data. Another novel feature of the present invention is the capability to automatically and instantaneously determine the stage of the mission and capture the image of mixed data for storage and transmitting to other platforms.

In the situations where the pilot wishes to view video generated by television system or thermal image systems of the mast mounted sight, annotate those images, and then store them in memory, the procedure is as follows. In the cockpit, the pilot first chooses the mast mounted sight mode to activate by pressing the MMS bezel key on the MFD to view the video from the mast mounted sight camera. The command for this flows from the pilot command processor 2 into the mission avionics graphics generator 4. The mission avionics graphics generator switches to the video images from the mast mounted sight video and these images are then transmitted to the digitize and video image apparatus 18 which was signaled to receive and display these signals through the mission avionics data link control apparatus 10. The analog video signal is digitized to include any overlaid data and then converted to video form before the video images are rendered on the multi-function display 139. At this point the pilot, through the pilot command processor 2, can direct the mission avionics data link control 10, to activate the capture video subfunction 135 with a command to the digitize and control video image apparatus 18. Once the image displayed on the multi-function display 139 is captured the pilot may, through different mechanisms in the cockpit, annotate the image. These annotation commands come through the mission avionics data link control 10 on to the global bus 5, and the image is then annotated through the data signal processing apparatus 20. Once the video image has been annotated, it can be compressed and formatted for either transmitting externally through the transmit/receive digitized data medium 138 from the data signal processing apparatus, or storing in memory (MDU) 3.

When the pilot transmits information externally, a command signal is sent through the mission avionics data link control 10 to the setup and control of transmit/receive medium apparatus 16 in order to configure the transmit/receive digitized data medium 138 to transmit image information. As described above, the transmit/receive digitized data medium 138 transmits either directly to a radio or to a radio via a digital modem. If the pilot wishes to transmit stored information, a command through the mission avionics data link control 10 to the data signal processing apparatus 20 retrieves the information from MDU 3 via the image data storage and retrieval interface apparatus 135. This information is encoded with error correction by the error correction apparatus 132 and then received by the data signal processing apparatus 20 for packaging. Depending on the chosen mode of operation for the datalink, the medium is configured accordingly and the information with a customized format is transmitted externally.

In the situation where the aircraft receives video, mission update, or situation awareness data externally, this information is first received through the transmit/receive digitized data medium 138. As described above, this medium is configured to receive the digitized image data that is being transmitted by an external source. From the medium, the information is transferred to the data signal processing apparatus 20. Once the signal processing means identifies the type of data received, the prioritization and authentication apparatus 14 is activated. Authentic image data received externally is encoded to validate mission ID and aircraft ID. Once authenticated, the data is then prioritized according to the type of mission the aircraft is on, aircraft identification, and the type of information contained in image file. Based on the priority assigned, a determination is made for each received image file as to whether to present to the pilot, to eliminate, or store away. When received image file has an acceptable priority, its error correction is removed at 132 and the compressed image file is stored in 3.

When an aircraft is flying a mission, certain types of information are more important to a pilot successfully completing the mission than others. The present invention includes a prioritization scheme which prioritizes the type of data received based on its content. For example, mission data containing video of engagement scenes and armament status or situation awareness data from a coordinate airplane are of greater importance and have a higher priority than regular map video images being transmitted by another aircraft. As such, this situation awareness data is immediately provided to the situation awareness overlay data apparatus 8 for inclusion on any of the images generated by the moving map generator 6. If the image data which is received is of low priority, the data signal processing apparatus 20 will assign an image header and store it in MDU 3. The pilot then may later retrieve this information for view or re-transmit.

All images which are stored in memory 3 are in a digital compressed form. If the pilot wishes to retrieve and view an image stored in memory, a command is first sent to the mission avionics data link control 10 which then through the data signal processing apparatus 20 retrieves the image from memory 3. The image is converted to a digital bitmap by data decompression/compression apparatus 131 and transmitted via the high speed data bus to digitize and control video image apparatus 18 which then converts the retrieved image from a digital bitmap to an analog video signal. This analog video signal is then transmitted to the MFD 139 for viewing by the pilot. As the image is being viewed, the pilot may annotate and then re-capture the image with subfunction 135. Through commands to the image data annotation apparatus 12 and the mission avionics graphics generator 4, from the pilot, the annotation process is completed. This annotated video image may then be converted back to a digital map which is then either put in memory 3 or transmitted externally via the data signal processing apparatus 20.

When mission update information is received from an external source, it is first identified by the data signal processing apparatus 20 and then authenticated via the prioritization and authentication apparatus 14. Once authenticated and otherwise decompressed and error corrections removed, it is transmitted via the global bus 5 based on its content to either the flight plan update and activate apparatus 110, the battlefield graphics update and activate 111, the target update and activate apparatus 112, the prepoint update and activate apparatus 113, or the communications update and activate apparatus 114. When this information is received, an advisory message to the pilot will appear on the screen of the MED 139 in the cockpit as to whether the pilot wishes to update this information or to, at least for the time being, ignore it. If the pilot wishes to update the mission information, the update is made to the active on-board database and will instantly affect the graphics presentation of newly activated flight plan, battle field graphics, targets which appear to the pilot on the MFD. For example, if the target is updated, this will appear on the images generated by either the moving map generator 6 or the mission avionics graphics generator 4.

If the pilot wishes to either delete images or whole data lists which are stored in memory, the pilot sends a command via the mission avionics data link control apparatus 10 to display the current image list on the MFD 139. The pilot may then select to either delete the entire list or the particular image, and the memory is automatically packed and the image list is updated. If the pilot wishes to increase image contrast or reduce the transmit time, the pilot sends a command via the mission avionics data link control apparatus 10 to the data signal processing apparatus 20 to either increase or decrease compression index.

Finally, in the situation where the pilot receives video images from an external source, the video images are transmitted via the transmit/receive digitized data medium 138 to the data signal processing apparatus 20. If the pilot does select to view any received images, this image file is decompressed by 131 and transmitted via the high speed data bus to the digitize and control video image apparatus 118, which then converts the bitmap to an analog video signal which is then transmitted to the MFD 139 for viewing. At this point the pilot may wish to annotate it, and then recapture the display image. Once this process is done, the digitize and control video image apparatus 18 then converts the annotated video image back to a digital bitmap and transmits it via the high speed data bus to the data signal processing apparatus 20. At this point, the data is then compressed via the data decompression/compression apparatus 131 and stored in memory 3. Subsequently, the pilot may retrieve the image for viewing or externally transmitting.

The foregoing is a novel and non-obvious embedded mission avionics data link system. The applicant does not intend to limit the invention through the foregoing description, but instead define the invention through the claims appended hereto.

The embodiments of the invention in which an exclusive property or right is claimed are defined as follows:

1. A mission avionics datalink system located onboard a vehicle comprising:

communication means which provides two way digitized data communications for the vehicle in a plurality of modes of operation;

data signal processing means in connection with the communications means which identifies information received externally by the vehicle through the communications means, and provides information generated internally by the vehicle systems to the communications means to be transmitted externally and to be transmitted internally to an appropriate component of the vehicle systems, the internal and external information comprising a plurality of mixed modes of data including external video date;

a datalink control means which recognizes and directs the processing of the information received externally and the information generated internally by the vehicle systems within the datalink system according to the plurality of mixed modes of data, said datalink control means being able to re-configure the mission avionics datalink system depending on the information processed, said datalink control means being configured to communicate with at least one other vehicle within the datalink system;

a prioritization means connected with the data signal processing means which prioritizes the internal and external information according to the type of mission the vehicle is on and information content and which authenticates the external information to ensure the external information is obtained from a legitimate source for use in operating on system parameters;

memory means to store the internal and external information;

display means to process the internal and external information and display to pilot of the vehicle; and annotation means to allow the pilot of the vehicle to simultaneously receive the internal and external information, including avionics and mission data, and to annotate the displayed information and either store or transmit the annotated display information externally the annotated display information being correlated with a unique parameter data set that characterizes the internal and external information.

2. The mission avionics datalink system of claim 1 wherein the data signal processing means includes means to compress and decompress the information.

3. The mission avionics datalink system of claim 1 wherein the data signal processing means includes means to correct errors in the information.

4. The mission avionics datalink system of claim 1 wherein the data signal processing means includes means to filter the information externally received.

5. The mission avionics datalink system of claim 1 wherein the datalink control means includes a pilot command processor which processes pilot input commands to determine an overall system state and sends process activation and control commands to a datalink control apparatus which then directs operations of the datalink according to the pilot commands and pre-programmed mission data included in the control apparatus.

6. The mission avionics datalink system of claim 1 wherein the prioritization means also includes an authentication means which decrypts and checks authenticity of the information from an external source and encrypts the internal information for transmission outside the vehicle, the decrypted information being used by the datalink system in conjunction with said annotation means to operate on system parameters.

7. The mission avionics datalink system of claim 1 wherein the annotation means receives inputs from avionics and mission data systems and include such inputs with the annotated display information.

8. The mission avionics datalink system of claim 1 wherein the communication means includes a radio and digital modem that can communicate in either a direct link mode or an indirect link mode.

9. The mission avionics datalink system of claim 8 wherein the communication includes a set-up and control apparatus which configures the radio and digital modem to either receive or transmit the information.

10. The mission avionics datalink system of claim 1 wherein the display means includes a mission avionics graphics generator which generates display page for viewing by the pilot in response to a plurality of inputs.

11. The mission avionics datalink system of claim 10 wherein the plurality of input includes mast mounted sight video.

12. The mission avionics datalink system of claim 10 wherein the plurality of inputs include mission avionics updates.

13. The mission avionics datalink system of claim 10 wherein the plurality of inputs includes a moving map generator.

14. The mission avionics datalink system of claim 13 wherein the input of the moving map generator includes icon symbology to generate awareness data.

15. The mission avionics data links system of claim 13 where in the selection of situation awareness icon symbology includes pop-up pipe-line of selective situation awareness data.

16. The mission avionics datalink system of claim 1 wherein the display means includes a mission avionics graphics generator video switch to continuously build coherent video image from different video sources.

17. The mission avionics datalink system of claim 16, wherein the coherent video image from different video sources are either stored internally or transmitted externally.

18. The mission avionics datalink system of claim 16, wherein the mission avionics graphics generator video switch works in conjunction with said annotation means.

19. A data link system located onboard an aircraft comprising:

a transmit/receive data medium to contact data sources external to the aircraft, which transmits and receives in a plurality of modes of operation;

a signal processing apparatus connected to the medium to identify and convert internal and external data which is transmitted and received through the medium for transmission to an appropriate component of the aircraft's systems, the internal data and external data comprising a plurality of mixed modes of data including external video data;

prioritization and authorization means which checks authorization on the data received by the medium and determines the priority of the received data according to a pre-defined standard where high priority data is retained to be displayed and low priority data is stored in a memory, the prioritization and authentication means authenticating the data to ensure the data is obtained from a legitimate source for use in operating on system parameters;

a mission avionics graphics generator which receives a plurality of inputs from the aircraft systems and provides graphics information for transmittal externally by the medium or for viewing by the pilot;

digitized and controlled video image means which receives graphics information from said processing means and said mission avionics graphics generator and converts said information to image form for display or digitizes the information for storage in the memory or transmission from the aircraft;

a data link control means which translates commands from the pilot to determine which mode the medium will operate, what information will be displayed to the pilot, and what data will be transmitted from the aircraft, said datalink control means being configured to communicate with at least one other vehicle within the data link system; and annotation means to allow the pilot of the aircraft to simultaneously receive the internal and external data, including avionics and mission data, and to annotate the displayed data and either store or transmit the annotated display data externally, the annotated display data being correlated with a unique parameter data set that characterizes the internal and external data.

20. The data link system of claim 19 further comprising means to improve image quality and contrast.

21. The data link system of claim 19 further comprising means to optimize the receive and transmit time for transmit/receive medium while operating in a direct link or indirect link mode.

22. The data link system of claim 19 further comprising means to continuous capture and send of motion image in real-time.

23. The data link system of claim 19 further comprising means to continuous receive and render of motion image in real-time.

24. The data link system of claim 19 further comprising means to view any image stored in the memory.

25. The data link system of claim 19 further comprising means to manage and recall all images stored in the memory, wherein the images stored were previously stored depending on the priority assigned by the prioritization and authorization means.

26. The data link system of claim 19 further comprising means to automatically request and respond to requests for situation awareness data.

27. The data link system of claim 19 further comprising means to filter all image data received.

28. The data link system of claim 19 wherein a map generator is connected to the mission avionics graphics generator in order to provide map information for display to the pilot.

29. The data link system of claim 28 wherein means are connected with the image data signal processing means to receive outside mission information and update the mission information in the map generator.

30. The data link system of claim 19 wherein said annotation means annotates the graphical information with words as an overlay on an image.

31. The data link system of claim 30 wherein the means to annotate graphical information includes means to annotate precision data, free text, and video images.

32. The data link system of claim 31 further comprising means to command and generate video annotation to overlay displayed images.

* * * * *